US009156284B2

(12) United States Patent
Nihashi et al.

(10) Patent No.: US 9,156,284 B2
(45) Date of Patent: Oct. 13, 2015

(54) PRINTER APPARATUS

(71) Applicant: TOSHIBA TEC KABUSHIKI KAISHA, Shinagawa-ku, Tokyo (JP)

(72) Inventors: Kiyotaka Nihashi, Shizuoka-ken (JP); Tsuyoshi Sanada, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/159,621

(22) Filed: Jan. 21, 2014

(65) Prior Publication Data

US 2015/0202895 A1 Jul. 23, 2015

(51) Int. Cl.

| | |
|---|---|
| ***B41J 11/00*** | (2006.01) |
| ***G01D 15/24*** | (2006.01) |
| ***B41J 2/325*** | (2006.01) |
| *B41J 11/42* | (2006.01) |
| *B41J 11/44* | (2006.01) |
| *B41J 11/02* | (2006.01) |
| *B41J 11/04* | (2006.01) |

(52) U.S. Cl.

CPC ................ *B41J 11/007* (2013.01); *B41J 2/325* (2013.01); *B41J 11/02* (2013.01); *B41J 11/04* (2013.01); *B41J 11/42* (2013.01); *B41J 11/44* (2013.01)

(58) Field of Classification Search

CPC .......... B41J 2/32; B41J 2/325; B41J 11/0095; B41J 15/042; B41J 11/42

See application file for complete search history.

(56) References Cited

U.S. PATENT DOCUMENTS

| | | | | |
|---|---|---|---|---|
| 7,417,657 B2 * | 8/2008 | Im et al. | ........................ | 347/218 |
| 2008/0003040 A1 * | 1/2008 | Sekino et al. | ................. | 400/188 |

FOREIGN PATENT DOCUMENTS

| | | |
|---|---|---|
| JP | 06-122248 | 5/1994 |
| JP | 10-194520 | 7/1998 |
| JP | 2011-068448 | 4/2011 |

* cited by examiner

*Primary Examiner* — Lisa M Solomon

(74) *Attorney, Agent, or Firm* — Amin, Turocy & Watson, LLP

(57) ABSTRACT

A printer apparatus comprises a housing of a main body of the apparatus, a cover which can be opened and closed relative to the housing, a paper conveyance path configured to convey paper; a rotary component configured to be arranged along the paper conveyance path to convey paper through the friction with paper, a rotary gear arranged in the rotary component, a sensor section configured to detect the rotation of the rotary gear, and a drive section configured to be connected with the rotary component to supply a drive force, wherein the rotary gear is arranged at either side of the housing and the cover, and the drive section, which is arranged at the other side of the housing and the cover where no rotary gear is arranged, is connected with the rotary gear and supplies a drive force for the rotary gear when the cover is closed.

3 Claims, 4 Drawing Sheets

PRINTER APPARATUS

FIELD

Embodiments described herein relate to a printer apparatus which prints on paper and issues the paper.

BACKGROUND

A printer apparatus which carries out a given printing operation on paper and issues the paper is provided with various sensors for detecting various errors. Most of the sensors for detecting various errors are used to detect only one kind of errors, for example, a cover-open sensor merely confirms whether or not the cover of the printer apparatus is closed correctly, and a jam sensor merely confirms whether or not paper jam occurs. Thus, it is considered to use one sensor to realize various detections including the detection on the error opening of a cover and the detection on the double-feeding of paper.

In paper jam detection, if a printer using cut paper and the like finishes the conveyance of the length of a paper, the receiving signal of a detection sensor is changed. Thus, the detection on paper jam can be carried out by confirming the signal. However, it is difficult to detect the jam of paper wound into a roll shape since the paper is continuous until it is cut. It is known that the detection on the paper jam can be realized by using the paper on the back side of which a black mark for detecting the conveyance of paper is arranged, however, in this detection, it is needed to use dedicated paper and sensors, and it is incapable of detecting other errors while detecting paper jam.

DETAILED DESCRIPTION

A printer apparatus comprises a housing of a main body of the apparatus, a cover which can be opened and closed relative to the housing, a paper conveyance path configured to convey paper, a rotary component configured to be arranged along the paper conveyance path to convey paper through the friction with paper, a rotary gear configured to be arranged in the rotary component, a sensor section configured to detect the rotation of the rotary gear, and a drive section configured to be connected with the rotary component to supply a drive force for the rotary component, wherein the rotary gear is arranged at either side of the housing and the cover, the drive section, which is arranged at the other side of the housing and the cover where no rotary gear is arranged, is connected with the rotary gear and supplies a drive force for the rotary gear when the cover is closed.

The printer apparatus according to the present embodiment is described below in detail with reference to accompanying drawings.

Figure 1:
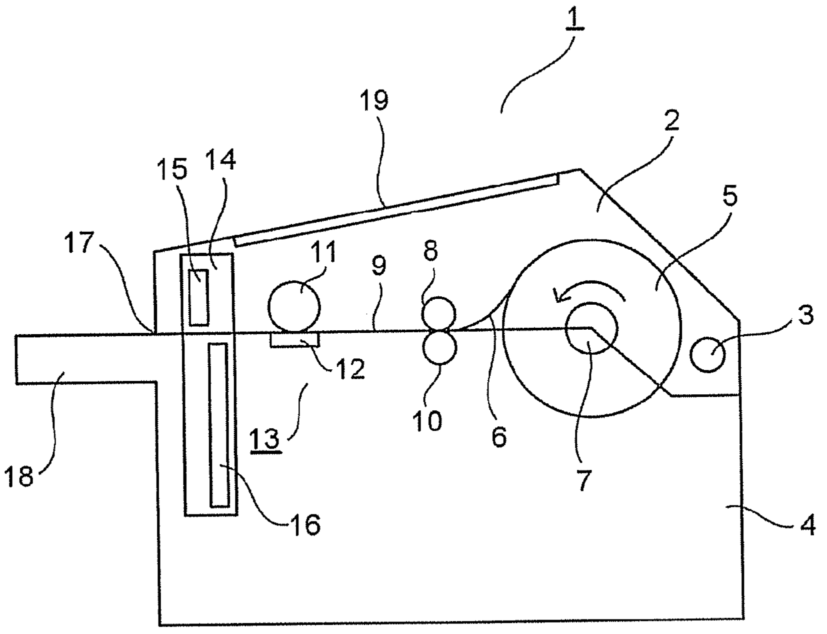
FIG. 1 is a diagram illustrating a main portion constitution of a printer apparatus according to the present embodiment.

FIG. 1 is a constitution diagram illustrating main portions of a printer apparatus 1 according to the present embodiment. Further, in the printer, as paper is conveyed from the right side of FIG. 1 to the left side of FIG. 1, the right side of FIG. 1 is referred to as an upstream side and the left side of FIG. 1 is referred to as a downstream side in the following description.

Figure 2:
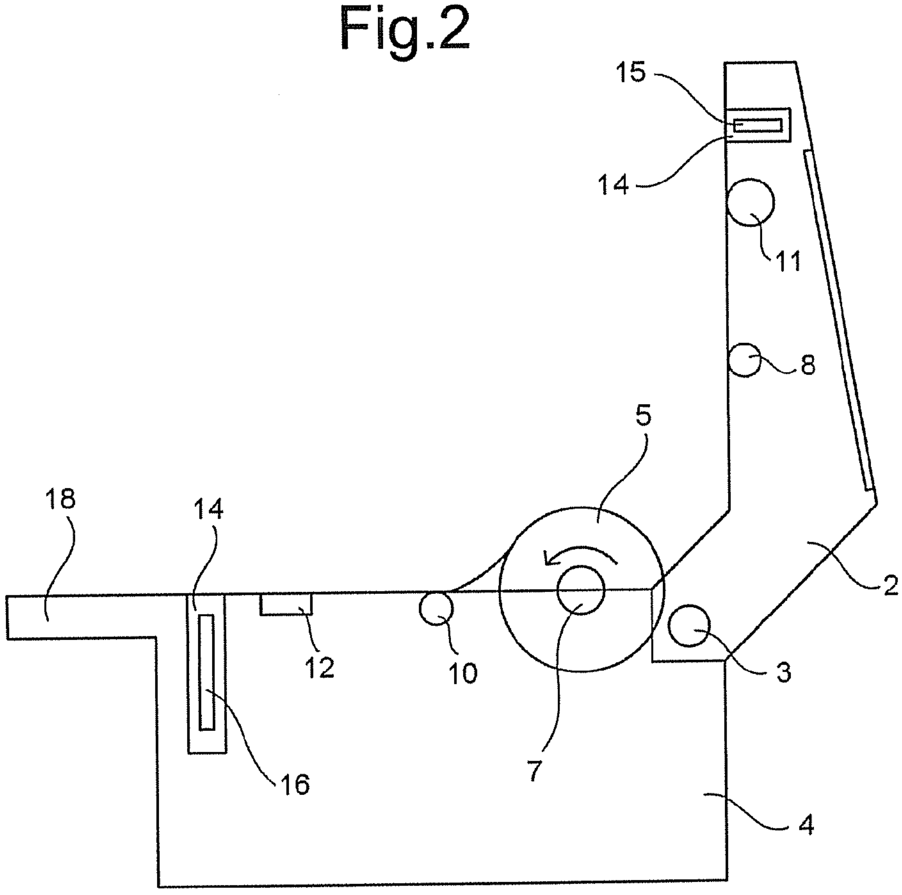
FIG. 2 is a diagram illustrating a main portion constitution of a printer apparatus when an opening and closing cover of the printer apparatus is opened according to the present embodiment.

In the printer apparatus 1, relative to a printer lower cover 4 serving as a housing of a main body of the apparatus, a printer upper cover 2 is mounted by taking a support shaft 3 as a rotation center in an openable/closable manner. FIG. 1 illustrates a state in which the printer upper cover 2 is closed, and FIG. 2 illustrates a state in which the printer upper cover 2 of the printer apparatus 1 is opened.

Roll shape paper 5 is rolled on a winding shaft 7 with the paper surface A6 facing the inside, and the winding shaft 7 is supported to be rotational in the printer apparatus 1. The rolled paper 5 is clamped and conveyed towards the downstream side by a feed roller 8 which is positioned at the downstream side of the conveyance direction of the paper 5 and an idle roller 10 which is arranged opposite to the feed roller 8 across a paper conveyance path 9. Further, a plurality of pairs of feed rollers 8 and idle rollers 10 are arranged along the paper conveyance path 9.

A platen roller 11 is arranged at the downstream side of the feed roller 8, and a thermal print head 12 is arranged opposite to the platen roller 11 across the paper conveyance path 9. The platen roller 11 and the thermal print head 12 constitute a printing mechanism 13 which prints on the paper surface A6 of the paper 5.

A cutter 14 is arranged at the downstream side of the printing mechanism 13. The cutter 14 has a fixed blade 15 and a movable blade 16 which slides towards the fixed blade 15 under the drive of a motor (not shown) to cut the paper 5 inserted in the slit (not shown) of the cutter 14.

Herein, the cutter 14 is described as the called sliding type cutter which has a movable blade sliding towards a fixed blade, however, the present invention is not limited to this, the cutter 14 may also be the so-called rotary cutter which cuts a paper by rotationally contacting a movable blade with a fixed blade.

Further, a paper discharge port 17 is arranged at the downstream side of the cutter 14 to discharge the paper 5 which is subjected to a given printing operation and then cut by the cutter 14 from the printer apparatus 1 to the outside. Further, a discharge table 18 is arranged below the paper discharge port 17 in the printer lower cover 4 to keep the cut paper 5.

Further, a display section 19 is arranged on the printer upper cover 4 of the printer apparatus 1. The display section 19, which is a liquid crystal display such as an LCD, has a function of displaying an error such as ‘paper 5 is jammed’ or ‘out of paper’ and displaying the state of the printer apparatus 1.

Figure 3:
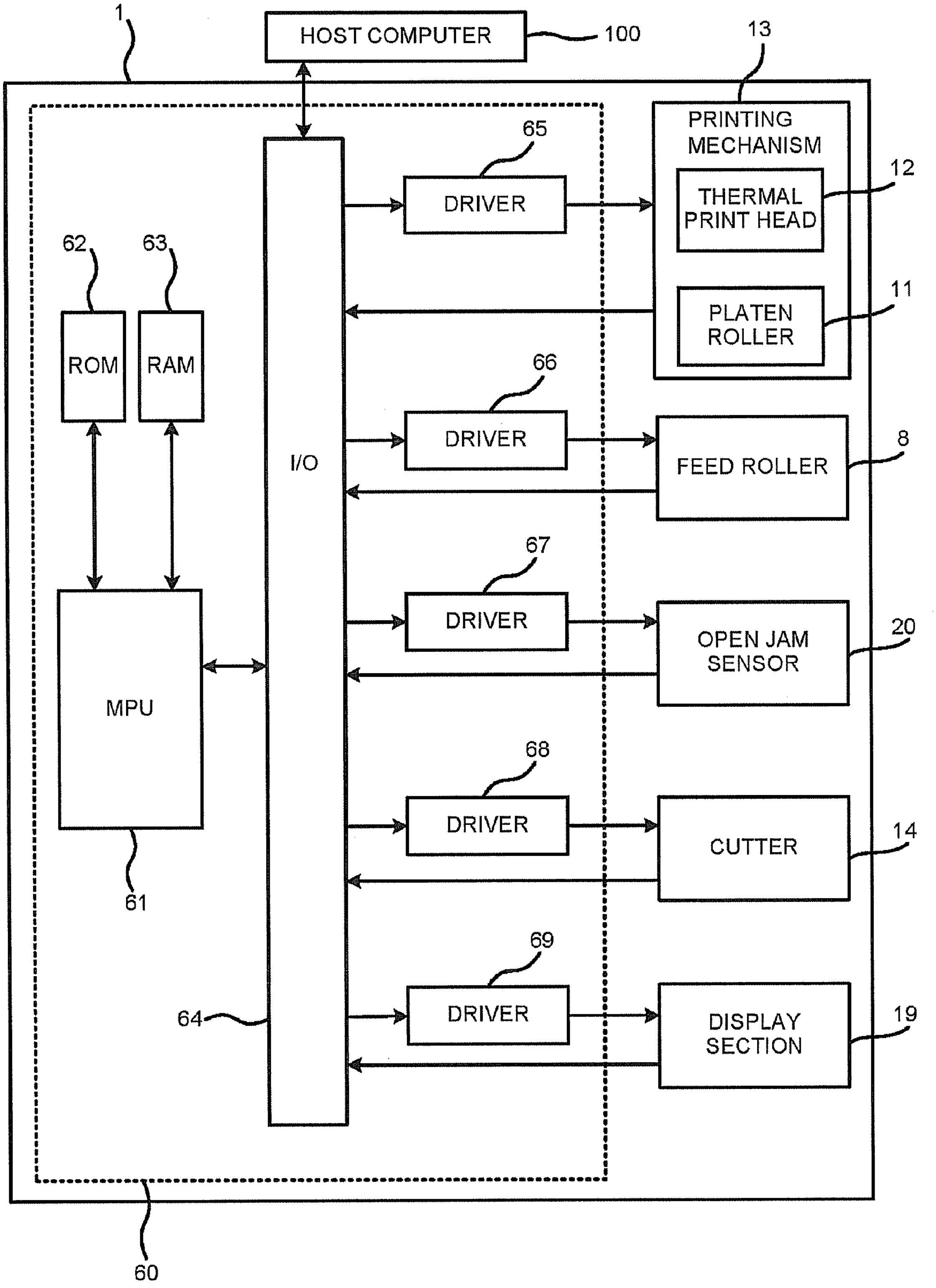
FIG. 3 is a block diagram illustrating a constitution of a control circuit of a printer apparatus according to the present embodiment.

FIG. 3 is a block diagram illustrating a constitution of a control circuit of the printer apparatus 1 according to the present embodiment. A control section 60 controls the paper conveyance, printing, paper cutting, the detection on jam of paper or opening of a cover, paper discharging, and the display of the condition of the printer.

The control section 60 is configured by, for example, a microcomputer which associates with a host computer 100 and carries out various controls. A micro processor unit (MPU) 61 of the control section 60 carries out various controls and operations such as a paper conveyance control, a printing control, a paper cutting control, the detection on jam of paper or opening of a cover and paper discharging control according to programs.

Further, a ROM 62 and a RAM 63 are arranged in the control section 60 as primary storage units for storing control programs executed by the MPU 61 and data generated during a control process or an operation process.

The ROM 62 is a read-only memory in which control programs and tables are stored, and the RAM 63 is a random access memory for storing the data generated during an operation process.

Further, an input/output unit (I/O) 64 is arranged in the control section 60 to acquire various input data from the host computer 100 and extract a control output from the control section 60 to the host computer 100. The I/O 64 is connected with the MPU 61, the ROM 62 and the RAM 63 via a bus line.

Further, the I/O 64 is connected with a first, a second, a third, a fourth and a fifth driver 65, 66, 67, 68 and 69 serving as units for extracting a control output.

The first driver 65 supplies a required drive output for the printing mechanism 13. The second driver 66 supplies a required drive output for the feed roller 8. The third driver 67 supplies a drive output for an open jam sensor 20 which will be described later. The fourth driver 68 supplies a drive output for the cutter 14. The fifth driver 69 supplies a display drive output for the display section 19 to enable the display section 19 to execute various displays.

When the paper 5 is printed by the printing mechanism 13, the platen roller 11 is rotationally driven by a motor in synchronization with the printing operation based on the control output of a printing instruction unit of the MPU 61. The thermal print heat 12 generates heat and prints on the paper surface A6 of the paper 5 based on the printing data from the host computer 100.

The MPU 61 of the control section 60 rotates the feed roller 8 and stops the rotation of feed roller 8 with the driver 66.

The MPU 61 of the control section 60 drives the open jam sensor 20 with the driver 67 and receives a detection signal.

The MPU 61 of the control section 60 drives, with the driver 68, the cutter 14 to cut the paper 5.

The MPU 61 of the control section 60 displays various information and errors of the printer apparatus 1 on the display section 19 under the drive of the driver 69.

Figure 4:
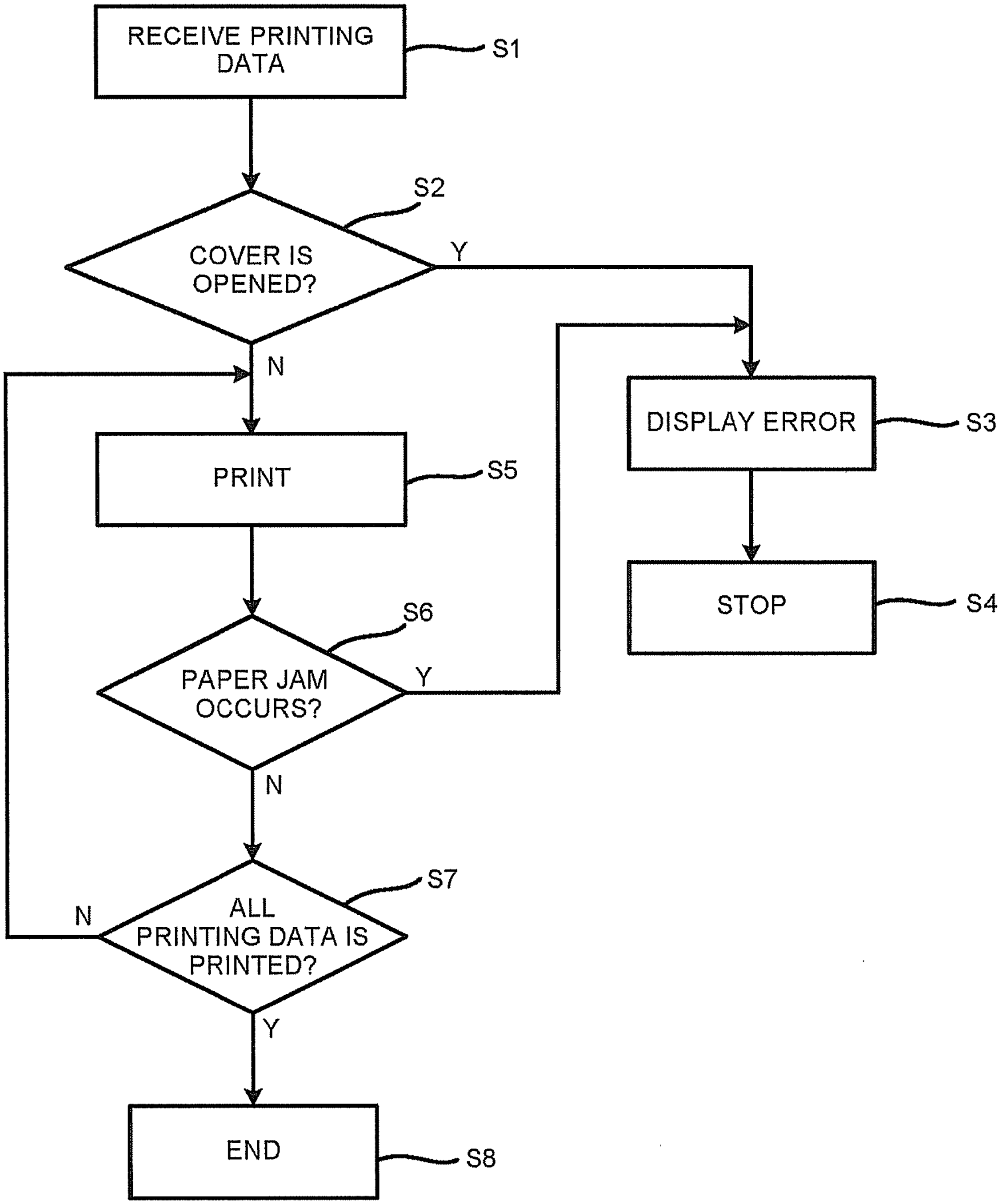
FIG. 4 is a flowchart illustrating an error detection method for the printer apparatus according to the present embodiment.

Next, the operations of the printer apparatus 1 are described below with reference to the flowchart in FIG. 4. The control section 60 carries out paper conveyance and printing operations according to a program stored in the ROM 62.

The operator first rotates the printer upper cover 2 of the printer apparatus 1 by taking the support shaft 3 as the center to open the printer upper cover 2 of the printer apparatus 1 and then loads the roll shape paper 5 rolled on the winding shaft 7 into the printer apparatus 1. Next, the operator pulls out the paper 5, places the front end of the paper 5 between the feed roller 8 and the idle roller 10 located at the most upstream side in the plurality of feed rollers 8 and idle rollers 10, and then closes the printer upper cover 2.

In this state, if the printing data is received from the host computer 100 (ACT S1), the control section 60 confirms whether or not the cover of the printer apparatus 1 is opened (ACT S2). The method for confirming whether or not the cover is opened is described with reference to FIG. 2, FIG. 5 and FIG. 6.

If the printer upper cover 2 is opened, as shown in FIG. 2, the platen roller 11 and the feed roller 8 move upwards together with the printer upper cover 2. Further, the thermal print head 12 and the idle roller 10, which are respectively arranged opposite to the platen roller 11 and the feed roller 8 across the paper conveyance path 9, are still at the side of the printer lower cover 4 serving as the housing of the main body of the apparatus.

Figure 5A:
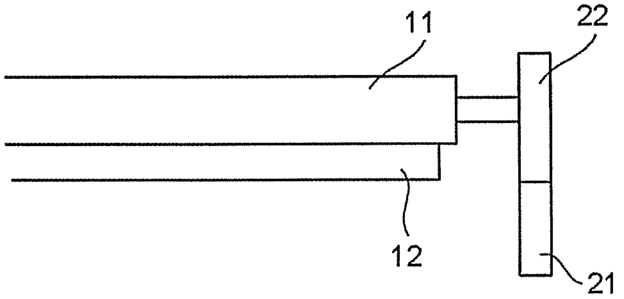
FIG. 5(A) is a diagram illustrating the relation between a rotary gear and a drive gear for driving the rotary gear in the printer apparatus according to the present embodiment.
Figure 5B:
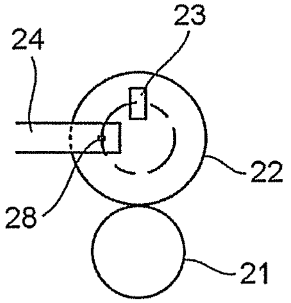
FIG. 5(B) is a diagram illustrating the relation between a platen gear and sensor block in the printer apparatus according to the present embodiment.
Figure 6:
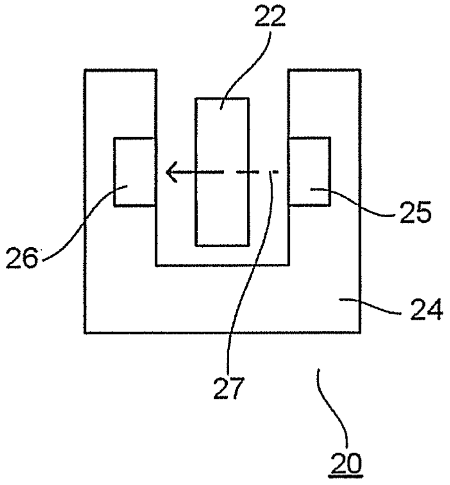
FIG. 6 illustrates a main portion constitution of a sensor section for detecting the rotation of a rotary gear in the printer apparatus according to the present embodiment.

Further, as shown in FIG. 5 (*a*), a platen gear 22 is arranged at an end of the platen roller 11, and a passing hole 23 is arranged in the platen gear 22, as shown in FIG. 5 (*b*). A drive gear 21 which meshes with the platen gear 22 to impart drive force is arranged at the side of the printer lower cover 4 serving as the housing of the main body of the apparatus. That is, the platen gear 22 meshes with the drive gear 21 when the printer upper cover 2 is closed, and then the platen roller 11 is rotated.

Further, a sensor block 24 substantially in a concave shape is arranged at the side of the printer lower cover 4 serving as the housing of the main body of the apparatus to clamp the platen gear 22 in a thickness direction. A light emitting section 25 and a light receiving section 26 are respectively arranged in opposite internal surfaces of the sensor block 24, and the light emitting section 25, the light receiving section 26, and the sensor block 24 constitute the open jam sensor 20. That is, the platen gear 22 is located in the open jam sensor 20 when the printer upper cover 2 is closed.

The light emitting section 25 continuously emits a detection light 27 to the light receiving section 26. The platen gear 22 rotates, and if the position of the passing hole 23 is consistent with the detection position 28 shown in FIG. 5 (*b*), the detection light 27 passes through the passing hole 23 and reaches the light receiving section 26, then a light receiving signal is sent. If the position of the passing hole 23 is not consistent with the detection position 28, then no light receiving signal is sent as the detection light 27 does not reach the light receiving section 26.

That is, no light receiving signal is sent if the printer upper cover 2 is not closed, thus, the platen roller 11 is rotated first and whether or not the printer upper cover 2 is opened can be confirmed according to whether or not a light receiving signal is sent.

Whether or not the cover of the printer apparatus 1 is opened is confirmed (ACT S2), when the cover is opened (YES in ACT S2), an error is displayed on the display section 19 (ACT S3) and the printer apparatus 1 is stopped (ACT S4).

Whether or not the cover of the printer apparatus 1 is opened is confirmed (ACT S2), when the cover is not opened (NO in ACT S2), the printer apparatus 1 sequentially prints the printing data from the host computer 100 (ACT S5).

The control section 60 confirms, at a predetermined interval, whether or not paper jam occurs in the printer apparatus 1 during the printing process (ACT S6). The confirmation on whether or not paper jam occurs is carried out by the open jam sensor 20.

The stationary rotation frequency of the platen roller 11 is determined in advance, thus a period in which the passing hole 23 is consistent with the detection position 28, that is, a period in which the light receiving section 26 detects the detection light 27 and sends a light receiving signal is determined. Paper jam or other error in the conveyance of the paper 5 occurs when no signal is sent in each period. Thus, whether or not paper jam occurs can be confirmed by confirming whether or not the light receiving section 26 sends a light receiving signal in the period of stationary rotation.

Whether or not paper jam occurs in the printer apparatus 1 is confirmed (ACT S6), if paper jam occurs (YEA in ACT S6), an error is displayed on the display section 19 (ACT S3) to stop the printer apparatus 1 (ACT S4).

If no paper jam occurs (NO in ACT S6), the control section 60 confirms whether or not all printing data is printed at a predetermined interval (ACT S7). If all printing data is not printed (NO in ACT S7), the control section 60 continues the printing until the printing job is completed (ACT S5) and continues to confirm whether or not paper jam occurs (ACT S6). The printing is ended (ACT S8) if all printing data is printed (YES in ACT S7).

As stated above, a sensor is arranged which imparts no drive force when the printer upper cover 2 is not closed, and the conveyance of paper is confirmed through the rotation of the sensor.

In this way, the conventional sensors for detecting the opening of a cover and for detecting paper jam are integrated into one sensor. Further, in the detection of paper jam, when detecting rolled continuous paper, a black mark is arranged on the back side of the paper so that the jam of the continuous paper can be detected by detecting the mark. However, the used paper needs to be special paper on which a black mark is arranged in advance, which leads to an increase in paper cost.

However, in the present invention, the conveyance state of paper is detected by detecting the rotation of a gear arranged at an end of a paper conveyance roller, therefore, cheaper paper can be used instead of the paper with black mark.

Further, in the present embodiment, the platen roller 11 and the platen gear 22 are arranged at the side of the rotary printer upper cover 2, the open jam sensor 20 and the drive gear 21 are arranged at the side of the printer lower cover 4 serving as the housing of the main body of the apparatus. That is because, compared with the case where the drive gear 21 is arranged at the side of the printer lower cover 4 serving as the housing of the main body of the apparatus, a bigger drive section is needed to drive the drive gear 21 if the drive gear 21 is arranged at the side of the printer upper cover 2. A bigger drive section is heavier, which requires a bigger rotation mechanism (not shown) such as a spring for opening/closing the printer upper cover 2. Thus, it is preferred that a drive section including the drive gear 21 is arranged at the side of the printer lower cover 4 serving as the housing of the main body of the apparatus.

However, the present invention is not limited to this, it may also be in a position relation in which the platen roller 11 is driven by closing the printer upper cover 2, and meanwhile, the open jam sensors 20 for detecting the rotation of the platen gear 22 arranged at an end of the platen roller 11 can be driven. For example, the open jam sensor 20 may be arranged at the side of the rotary printer upper cover 2 while the drive gear 21 is arranged at the side of the printer lower cover 4 serving as the housing of the main body of the apparatus. Further, the drive gear 21 may be arranged at the side of the rotary printer upper cover 2 while the platen roller 11 and the open jam sensor 20 are arranged at the side of the printer lower cover 4 serving as the housing of the main body of the apparatus.

Further, in the present embodiment, the platen gear 22 having the passing hole 23 is arranged at an end of the platen roller 11. However, the platen gear 22 is not necessarily arranged at an end of the platen roller 11, but may also be arranged at an end of a component, such as the feed roller 8 or the idle roller 10, which has a function of conveying paper through rotation when the paper is conveyed.

Further, in the present embodiment, only one passing hole 23 is arranged. When the printer is stopped, the position relation between the passing hole 23 and the detection position 28 is unclear, thus, the rotation of one whole cycle is needed to detect whether or not the cover is opened. When the rotation of one cycle takes a long time, and correspondingly, a long time is taken to determine whether or not the cover is opened. To prevent this situation, it is preferred to arrange a plurality of passing holes 23. When two holes are arranged at the same intervals, the rotation of at most a half cycle is needed to determine whether or not the cover is opened, similarly, when four passing holes 23 are arranged, the rotation of at most a quarter of a cycle is needed to determine whether or not the cover is opened, which shortens the time taken to determine whether or not the cover is opened. Further, in stationary rotation, as the time interval at which the light receiving section 26 sends a light receiving signal can be mastered in advance even if a plurality of passing holes 23 are arranged, no bad influence is caused to the detection of paper jam.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A printer apparatus, comprising:

a housing of a main body of the apparatus;

a cover which is arranged in an openable/closable manner relative to the housing;

a paper conveyance path configured to convey paper;

a rotary component configured to be arranged along the paper conveyance path to convey paper through the friction with the paper;

a rotary gear configured to be arranged in the rotary component;

a sensor section configured to detect the rotation of the rotary gear; and a drive section configured to be connected with the rotary component to supply a drive force, wherein the rotary gear is arranged at either side of the housing and the cover, and the drive section, which is arranged at the other side of the housing and the cover where no rotary gear is arranged, is connected with the rotary gear and supplies a drive force for the rotary gear when the cover is closed, and the rotary gear has a passing hole through which light passes, and the sensor section comprises a light emitting section for irradiating light to the passing hole and a light receiving section for receiving the light passing through the passing hole.

2. The printer apparatus according to claim 1, wherein the drive section is arranged at the side of the housing of the main body of the apparatus.

3. The printer apparatus according to claim 1, wherein a plurality of passing holes are arranged.

* * * * *